March 11, 1969 R. L. DAVEE ET AL 3,432,351

PROCESS FOR PRODUCING ELECTRODES FOR GALVANIC BATTERIES

Original Filed Feb. 3, 1967

INVENTORS
ROBERT L. DAVEE
DEMETRIOS V. LOUZOS
BY
ATTORNEY

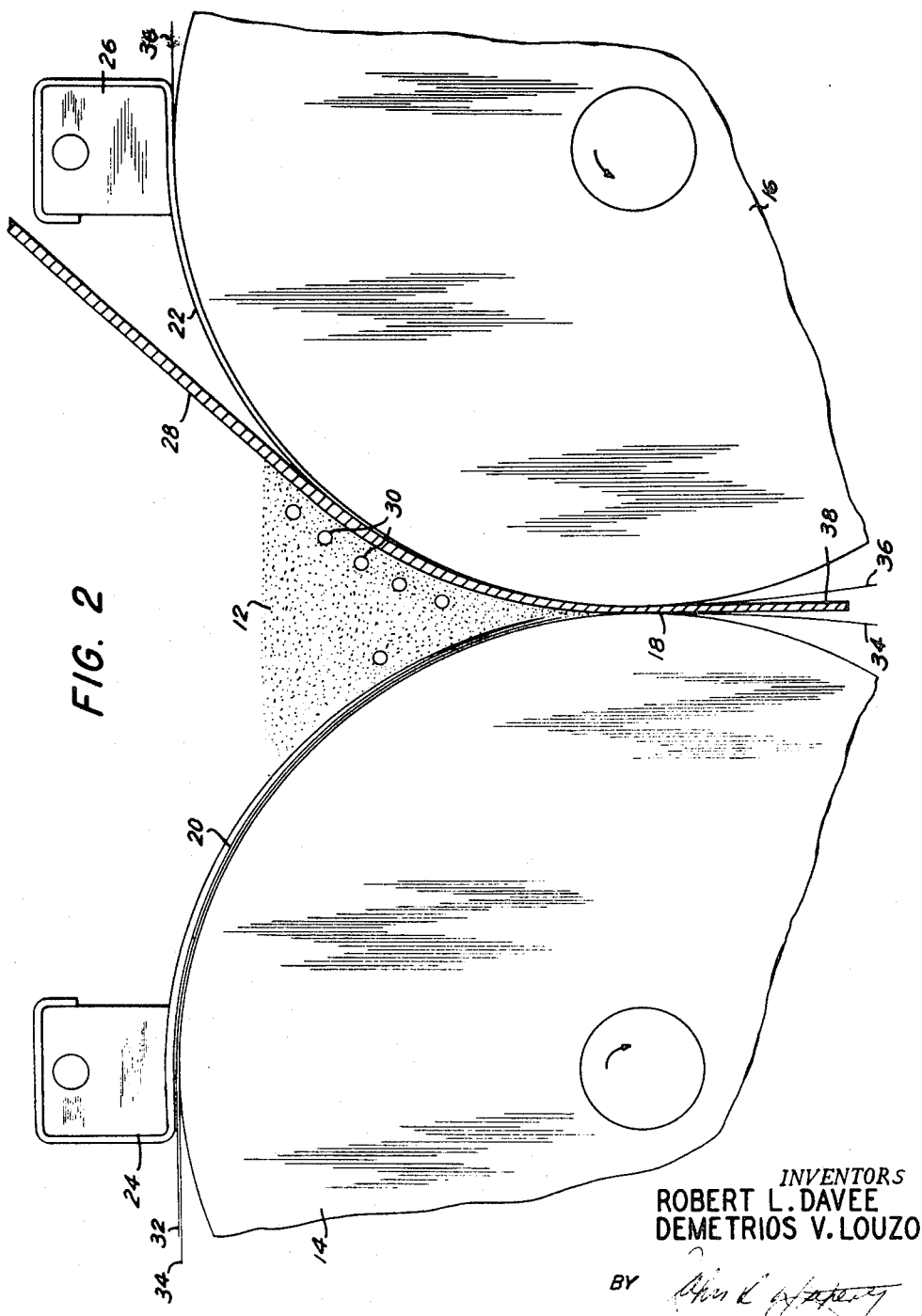

March 11, 1969 R. L. DAVEE ET AL 3,432,351
PROCESS FOR PRODUCING ELECTRODES FOR GALVANIC BATTERIES
Original Filed Feb. 3, 1967 Sheet 3 of 4
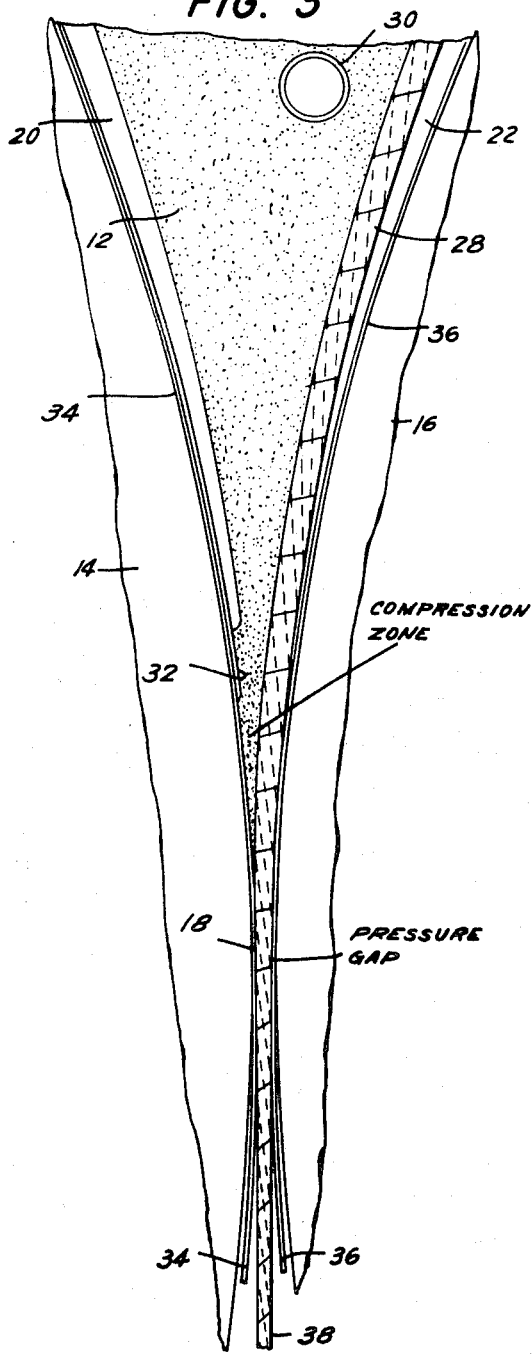
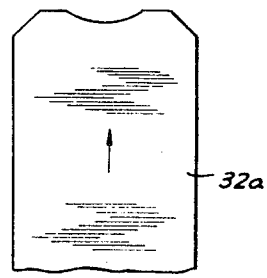
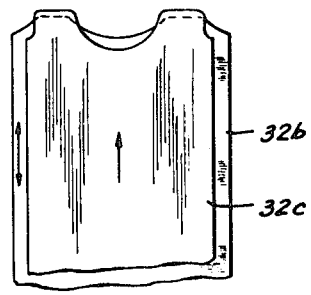
INVENTORS
ROBERT L. DAVEE
DEMETRIOS V. LOUZOS
BY
ATTORNEY United States Patent Office 3,432,351
Patented Mar. 11, 1969

3,432,351
PROCESS FOR PRODUCING ELECTRODES
FOR GALVANIC BATTERIES
Robert L. Davee, Northboro, Mass., and Demetrios V. Louzos, Rocky River, Ohio, assignors to Union Carbide Corporation, a corporation of New York
Continuation of application Ser. No. 613,949, Feb. 3, 1967. This application Jan. 2, 1968, Ser. No. 695,292
U.S. Cl. 136—67     5 Claims
Int. Cl. H01m 35/22, 43/02

ABSTRACT OF THE DISCLOSURE

For use in galvanic batteries, electrodes are produced by a process wherein dry powders of an active material are fed to a pair of spaced pressure rollers together with a conductive carrier grid such as expanded metal, while at the same time filling the openings of the grid and compacting the dry powders therein and wherein the filled grid is then compressed between the pair of spaced pressure rollers to pressure bond the dry powders within the grid.

---

Figure 1:
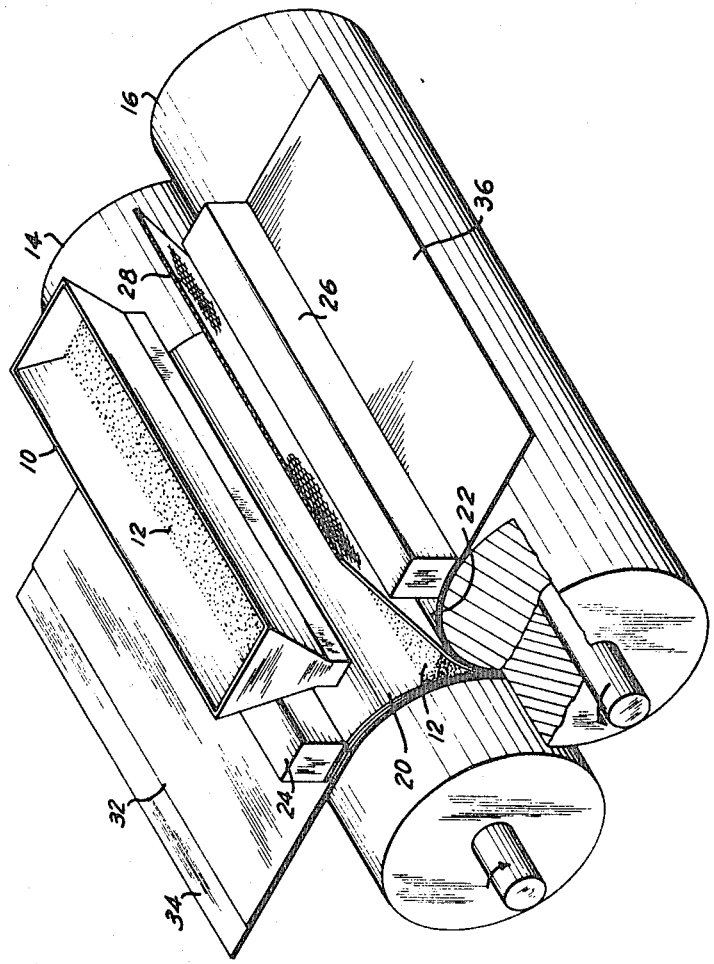

This application is a continuation of application Ser. No. 613,949, filed on Feb. 3, 1967, now abandoned, which is a division of application Ser. No. 240,800, filed on Nov. 29, 1962, now Patent No. 3,310,437.

The present invention relates to a process for producing electrodes for galvanic batteries and especially secondary batteries of the alkaline type.

In the manufacture of alkaline secondary batteries, it has recently become the practice to employ electrodes in cylindrical form or so-called "jelly roll" constructions wherein elongated strips of porous electrode material are wound into cylindrical bodies. Such electrode structures are characterized by the provision of high capacities per unit volume of active material.

Presently, electrodes of the aforementioned type are made from porous sintered metal plaques impregnated with a solution of an active material. The main disadvantage of these electrodes is that they are difficult and expensive to manufacture. For instance, it is generally necessary in manufacturing the electrodes to impregnate the plaques several or more times, followed by washing and drying the plaques, in order to achieve a desired electrode capacity. Such procedures are time-consuming, costly and require expensive equipment. Another disadvantage resides in the brittleness and consequent inability of the sintered plaques to be shaped or wound into cylindrical form without cracking or spalling with the attendant loss of active material.

It is the principal object of the present invention to provide an improved process for producing electrodes for galvanic batteries and especially secondary batteries of the alkaline type.

Another object is to provide an improved process for producing galvanic battery electrodes which are adapted to use in so-called "jelly roll" form without the disadvantages of cracking or spalling due to brittleness of the electrode.

Still another object is to provide an improved process for producing galvanic battery electrodes in which the use of sintered metal plaques and the necessity for impregnating the plaques with the active material are eliminated.

Still another object is to provide an improved process for producing galvanic battery electrodes which is simple and adapted to a single, continuous operation.

In accordance with the present invention, an improved electrode for use in galvanic batteries and especially secondary batteries of the alkaline type is provided comprising a powdered mass of an active material embedded within and pressure bonded to a conductive carrier grid.

More specifically, the invention contemplates a process for producing an improved electrode comprising the steps of feeding substantially dry powders of an active material together with a conductive carrier grid, to a pair of spaced pressure rollers, filling the openings in the grid with the dry powders as the grid is passed between the pair of pressure rollers and then compressing the grid between the rollers to reduce its thickness and to bond or lock the dry powders within the openings of the grid.

"Substantially dry powders" as used herein and in the appended claims is meant to include powders containing up to about 10 percent of moisture or liquid, although it is preferred to employ essentially dry powders of the active material in the practice of the invention.

Figure 6:
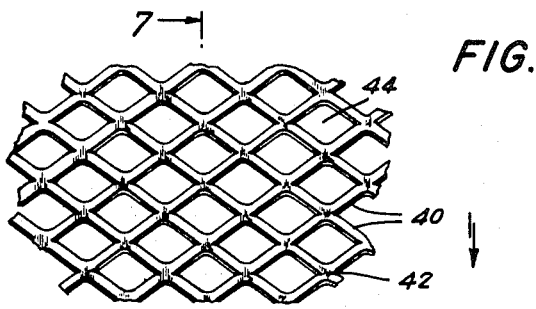
Figure 7:
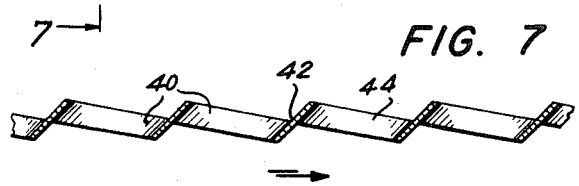
Figure 8:
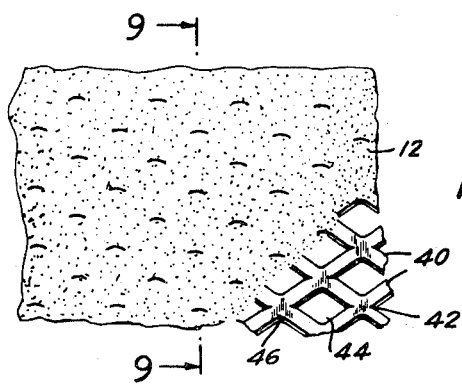
Figure 9:
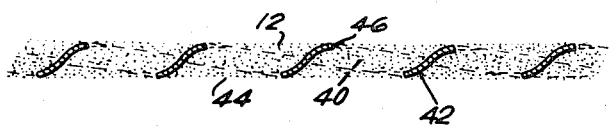

In the accompanying drawings:
FIG. 1 is a perspective view of apparatus for producing an improved electrode in accordance with the invention;
FIG. 2 is an enlarged side elevational view of the apparatus shown in FIG. 1;
FIG. 3 is an enlarged fragmentary view of a portion of the apparatus shown in FIG. 2;
FIG. 4 is a plan view of adjustable shim means for controlling the powder gradient or density across the width of the electrode;
FIG. 5 is a similar view of a modification of the adjustable shim means shown in FIG. 4;
FIG. 6 is a fragmentary plan view of a preferred conductive grid for use in the invention;
FIG. 7 is a sectional view taken along the line 7—7 in FIG. 6;
FIG. 8 is a fragmentary plan view of an electrode produced in accordance with the invention; and
FIG. 9 is a sectional view taken along the line 9—9 in FIG. 8.

Referring to the drawings and particularly to FIGS. 1 and 2, a hopper 10 is provided for continuously feeding substantially dry powders 12 of an active material to a pair of horizontal pressure rollers 14, 16, suitably composed of steel. The pair of horizontal pressure rollers 14, 16 are oppositely driven by a suitable gear mechanism, not shown, and are spaced apart so as to provide a pressure gap 18 therebetween as shown in FIG. 2.

The dry powders 12 are fed between roll covers 20, 22 mounted over the pair of horizontal rollers 14, 16. These roll covers 20, 22 terminate a short distance above the pressure gap 18 as shown in FIGS. 2 and 3, and define a zone of compression in close proximity thereto, i.e., a zone in which the dry powders 12 contact the surface of at least one of the pair of rollers 14, 16. To vary the depth of the compression zone, the roll covers 20, 22 are mounted to adjustable supports as at 24, 26, respectively. Suitably, the roll covers 20, 22 are composed of a corrosion-resistant material, as for example steel coated with a layer of fused ceramic or glass.

A continuous strip of a conductive carrier grid 28 is fed to the pair of horizontal pressure rollers 14, 16 together with the dry powders 12 of active material. As best seen in FIGS. 2 and 3, the grid 28 is preferably fed along the surface of one of the roll covers 22 and at a tangent to the respective roller 16. In this manner, the dry powders 12 are drawn into the grid openings as the grid 28 is fed between the pair of rollers 14, 16. When the grid 28 enters the compression zone, the dry powders 12 substantially entirely fill and are compacted in the openings of the grid 28. To aid in filling the grid 28 as it passes to the compression zone, vibrator rods may be provided as shown at 30.

The conductive carrier grid 28 enters the pressure gap 18 and is compressed between the pair of horizontal rollers 14, 16. It will be noted that the spacing of the pressure gap 18 is less than the grid thickness so that the grid 28 is compressed a predetermined amount in order to bond or lock the dry powders 12 therein as shall be described hereinafter in greater detail.

With the provision of the roll covers 20, 22, the distribution of the dry powders 12 is substantially uniform along the length of the grid 28. It has been found, however, that the powder gradient or density may vary somewhat across the width of the grid 28 since the dry powders 12 tend to spread and accumulate intermediate the center and longitudinal edges of the grid 28 as both enter the compression zone between the pair of horizontal rollers 14, 16. Furthermore, the powder gradient or density may vary across the width of the grid 28 depending on other factors, i.e., the grid feed rate, powder size, the uniformity and nature of the grid structure, the diameter of the pressure rollers 14, 16 and the thickness of the grid 28.

For the purpose of uniformly distributing the dry powders 12 across the width of the grid 28, adjustable shim means may be provided underneath the roll covers 20, 22. The adjustable shim means is composed of a metal sheet 32, the leading edge of which is contoured to control the flow of dry powders 12 into different portions of the grid 28. Preferably, the metal sheet 32 is positioned beneath only the roll cover 20 on the respective roller 14 and opposite to the cover 22 against which the grid 28 is fed tangentially as shown in FIGS. 2 and 3. It will also be seen that the leading edge of the metal sheet 32 extends slightly beyond the roll cover 20 and determines the bite point between the dry powders 12 and the roller 14. The metal sheet 32 may be adjusted by any suitable means, as for example by a simple locking slide mechanism (not shown) into which the metal sheet 32 is clamped.

FIG. 4 shows an adjustable shim means composed of a single sheet 32a, the leading edge of which is contoured to direct a maximum amount of dry powders 12 into the center and longitudinal edges of the grid 28.

Another adjustable shim means is shown in FIG. 5 wherein two metal sheets 32b, 32c are provided, each of which is separately movable into the compression zone for varying the effective contour, and hence the powder flow into the grid 28. The use of the two contoured metal sheets 32b, 32c may be preferred where the flow characteristics of a specific powder composition require it.

Continous strips of paper 34, 36 are preferably fed into the compression zone and pressure gap 18 from underneath the metal sheet 32 and the roll cover 22 in order to aid the compression of the dry powders 12, i.e., the paper strips 34, 36 provide a rough surface which increases the coefficient of friction of the pair of pressure rollers 14, 16. The presence of the paper strips 34, 36 also prevents the surfaces of the electrode from becoming polished or glazed by the pair of rollers 14, 16. In addition, the comparatively soft paper strips 34, 36 serve to recess the dry powders 12 into the grid openings and to prevent thin layers of dry powders 12 from adhering to the surfaces of the grid 28. Furthermore, the paper strips 34, 36 shield the surfaces of the rollers 14, 16 so as to keep them clean, and also are sufficiently porous to permit egress of some air as the dry powders 12 are compressed. A suitable paper is kraft paper having a thickness of approximately 0.003 inch.

The finished electrode strip 38 emerges from the pressure gap 18 between the pair of rollers 14, 16 together with the continuous strips of paper 34, 36 which are then withdrawn therefrom. Suitably, the electrode strip 38 is cut into individual lengths or is fed to a take-up roll, not shown, for storage or subsequent treatment.

Preferably the continuous strips of paper 34, 36 are maintained under slight tension in order to prevent buckling as they are fed into the pair of rollers 14, 16. Although not shown, the paper strips 34, 36 are suitably fed from a supply roll and then similarly would on take-up rolls for disposal or possible reuse. In a similar manner, the continuous strip of conductive carrier grid 28 is fed from a supply roll and is maintained under substantially constant tension by any suitable means desired.

Generally, the dry powders 12 of active material should be kept at a relatively constant level above the compression zone as the grid 28 is fed therethrough. Further, a fixed force may be applied to the dry powders 12 to assure a more uniform powder distribution. The speed (r.p.m.) of the pair of horizontal pressure rollers 14, 16 essentially determines the grid feed rate since the grid 28 is actually drawn through both of the rollers 14, 16 as it is continuously fed into the dry powders 12. A grid feed rate of approximately 8 to 30 feet per minute has been used successfully for different powder compositions. Although the dry powders 12 are preferably fed vertically from a hopper 10 as shown in FIG. 1, it may be convenient to use another arrangement, as for example a horizontal feed screw of a conventional design.

Referring now to FIGS. 6 and 7, a preferred conductive carrier grid for use in the invention is shown. The preferred grid comprises a continuous web of expanded metal having a plurality of strands 40 integrally joined as at 42. In the direction of the arrows indicated, i.e., the direction of feed of the grid, the strands 40 are joined atop one another at the junctures 42 in a somewhat co-linear fashion as best shown in FIG. 7.

In comparison to conventional expanded metal wherein the grid openings are elongated or "diamond" shaped, the preferred grid structure of the invention is composed of a plurality of substantially square openings or "pockets" 44, these openings providing larger regions bound by the grid to contain the dry powders 12 with a minimum of grid passes into the compression zone, the grid openings ture, it is necessary to stretch the grid a greater amount than in the manufacture of the conventional expanded metal, i.e., an amount generally sufficient to form co-linear junctures 42. It should also be noted in FIG. 7 that the junctures 42 are disposed at an angle to the direction of feed (approx. 45 to 90 degrees) so that as the grid passes intothe compression zone, the grid openings 44 are "up and open" to receive the dry powders 12 and to actually draw them into the grid as before described.

It will of course be understood that almost any conductive carrier grid may be used in the practice of the invention so long as it can be compressed a sufficient amount to lock the dry powders 12 in grid openings. In addition to the preferred grid structure, other suitable conductive carrier grids include conventional expanded metal, metal lath and honeycomb structures.

The thickness of the conductive carrier grid should be sufficient to provide electrodes which are strong and at the same time highly flexible. Generally, a grid thickness in the range of from about 0.02 inch to 0.1 inch is suitable for cylindrically formed or so-called "jelly roll" electrodes of the type used in nickel-cadmium batteries, for instance. The number of openings in the grid is important in respect to maintaining a high electrode capacity, approximately one hundred openings per square inch of grid being suitable in most instances. The conductive grid should, of course, be inert to the battery system in which it is used; for example, in nickel-cadmium batteries, the grid may be composed of nickel.

An essential feature of the present invention is the compression of both the conductive carrier grid and the dry powders 12 of active material. It is this combined compression which makes it possible to mechanically lock the dry powders 12 in the grid openings so that when the electrode is shaped into cylindrical form the dry powders will not become loosened and dislodged. Furthermore, since the dry powders 12 are initially compacted into the grid openings and then compressed together with the conductive grid, a high powder density and electrode capacity is achieved.

Depending on the particular type of conductive carrier grid employed, the compression necessary to reduce the grid thickness a sufficient amount to lock the dry powders 12 therein will generally vary. It has been found that a compression of between about 5 percent and 60 percent of the original grid thickness is suitable for most types of presently available grids. A preferred compression is approximately 25 percent of the thickness of the grid.

FIGS. 8 and 9 show an electrode in accordance with the invention employing the preferred conductive carrier grid previously described. It will be noted that the grid openings 44 are substantially entirely filled with the dry powders 12 of active material, and that the grid strands 40 and junctures 42 are compressed and flattened out along the longitudinal plane of the grid, enveloping the dry powders 12 as indicated at 46.

In the practice of the invention, the dry powders 12 may be of any convenient particle size or shape so long as they can be uniformly fed, compacted and compressed into the conductive carrier grid. The particle size is not critical, anywhere from sub-micron up to about 35 mesh screen size having been used successfully. The dry powders 12 may consist of metallic or nonmetallic materials or mixtures of both, such as a mixture of $Ni(OH)_2$, Ni and Cd metal powders for producing the positive electrodes of nickel-cadmium batteries. It may also be desirable to employ powders or relatively short fibers (1/16 inch or less) of a binder, as for example Dynel fibers, or a conductive material, such as powdered or fibrous graphite.

In addition to the foregoing, a great many active materials have been employed for producing electrodes in accordance with the invention. For instance, a number of electrodes have been made for primary batteries using dry powders of manganese dioxide, silver oxide and zinc.

It will be apparent from the above description that the present invention provides a process for producing an improved electrode which is strong but highly flexible and especially adapted to use in cylindrical or so-called "jelly roll" form, and which is inexpensive and relatively easy to manufacture in a single, continuous operation.

An important advantage of the invention resides in the use of substantially dry powders of an active material which makes it possible to produce electrodes for secondary batteries of the alkaline type without the costly procedures of impregnation as previously required in the manufacture of sintered electrodes. Furthermore, since the porosity of the electrodes can be easily controlled in carrying out the process of the invention, the use of dry powders eliminates the necessity for electrode formation, i.e., the continuous charging and discharging of the electrodes to build up the porosity to a desired level. It may also be mentioned that since the composition of the dry powders can be easily varied to produce electrodes in most any condition of charge, it is entirely possible to construct batteries which are fully charged, discharged or partially charged when manufactured.

We claim:
1. A continuous process for producing electrodes for use in galvanic batteries comprising the steps of:
 (a) continuously feeding to a pair of horizontal pressure rollers, substantially dry powders of an active material and a conductive carrier grid of expanded metal consisting essentially of a network of interconnected strands joined together at junctures so arranged as to define a plurality of open pockets exposed along the longitudinal surfaces thereof, the junctures being in a plane traversing the thickness of said grid and having portions thereof disposed at the longitudinal surfaces of said grid, said pair of pressure rollers being spaced apart a distance which is less than the thickness of said grid so as to define a pressure gap theretween;

(b) continuously passing said dry powders of active material between said pair of pressure rollers and towards said pressure gap therebetween, while at the same time continuously passing said grid of expanded metal longitudinally between said pair of pressure rollers;
 (c) continuously filling the open pockets of said grid of expanded metal with said dry powders of active material by pulling said grid through said dry powders as said grid passes between said pair of pressure rollers towards the pressure gap therebetween; and
 (d) continuously compressing said grid of expanded metal with said dry powders of active material contained within the opened pockets thereof between said pair of pressure rollers, while at the same time flattening those portions of said junctures disposed at the longitudinal surfaces of said grid in a substantially flatwise manner along the plane of said longitudinal surfaces, thereby physically bonding said dry powders of active material within the open pockets of said grid to produce a coherent, self-supporting, flexible, porous electrode unit.

2. The process in accordance with claim 1 wherein said dry powders of active material are continuously fed between roll covers positioned over said pair of horizontal pressure rollers, the lower ends of said roll covers terminating above but in close proximity to the pressure gap defined between said pressure rollers.

3. The process in accordance with claim 2 wherein continuous strips of paper are continuously fed underneath said roll covers over the surfaces of each of said pair of horizontal pressure rollers and through the pressure gap defined therebetween together with said dry powders of active material and said grid of expanded metal.

4. The process in accordance with claim 2 wherein said grid of expanded metal is continuously fed along the surface of one of said roll covers together with said dry powders of active material into the pressure gap defined between said pair of horizontal pressure rollers.

5. The process in according with claim 2 wherein the flow of said dry powders of active material into the open pockets of said grid of expanded metal is controlled by adjustable shims positioned beneath said roll covers and extending beyond the lower edges thereof in close proximity to the pressure gap defined between said pair of horizontal pressure rollers.

References Cited

UNITED STATES PATENTS

| | | | |
|---|---|---|---|
| 2,758,336 | 8/1956 | Franssen | 18—9 |
| 3,002,834 | 10/1961 | Di Pasquale | 75—208 |
| 3,150,974 | 9/1964 | Lund et al. | 75—208 |
| 2,954,417 | 9/1960 | Lehovec et al. | 136—13 |
| 2,970,779 | 2/1961 | Duty | 241—230 |
| 3,007,991 | 11/1961 | Duddy | 136—20 |
| 3,082,278 | 3/1963 | Doyen | 136—20 |
| 3,082,284 | 3/1963 | Mount | 136—120 |
| 3,083,249 | 3/1963 | Belove | 136—13 |
| 3,099,899 | 8/1963 | Horn et al. | 136—51 |
| 3,108,909 | 10/1963 | Stanimirowitch | 136—6 |
| 3,119,722 | 1/1964 | Tietze et al. | 136—13 |
| 3,174,219 | 3/1965 | Horn et al. | 136—120 |

ALLEN B. CURTIS, *Primary Examiner.*

A. SKAPARS, *Assistant Examiner.*

U.S. Cl. X.R.

29—420; 75—208

PO-1050
(5/69)

UNITED STATES PATENT OFFICE
CERTIFICATE OF CORRECTION

Patent No. 3,432,351            Dated March 11, 1969

Inventor(s) R. L. Davee and D. V. Louzos

It is certified that error appears in the above-identified patent and that said Letters Patent are hereby corrected as shown below:

Column 4, lines 33 and 34 after "grid" in line 33 (first occurrence) "passes into the compression zone, the grid openings ture", should be deleted and the following substituted --material per unit of volume. To achieve this structure--.

Column 5, line 38, "inexpesive" should read --inexpensive--.

Column 6, line 41, claim 5, "according" should read --accordance--.

SIGNED AND
SEALED
SEP 29 1970

(SEAL)
Attest:

Edward M. Fletcher, Jr.
Attesting Officer

WILLIAM E. SCHUYLER, JR.
Commissioner of Patents